July 15, 1930.  R. G. HANDY  1,770,738
VEHICLE SIDE LIGHT
Filed April 25, 1927   3 Sheets-Sheet 1
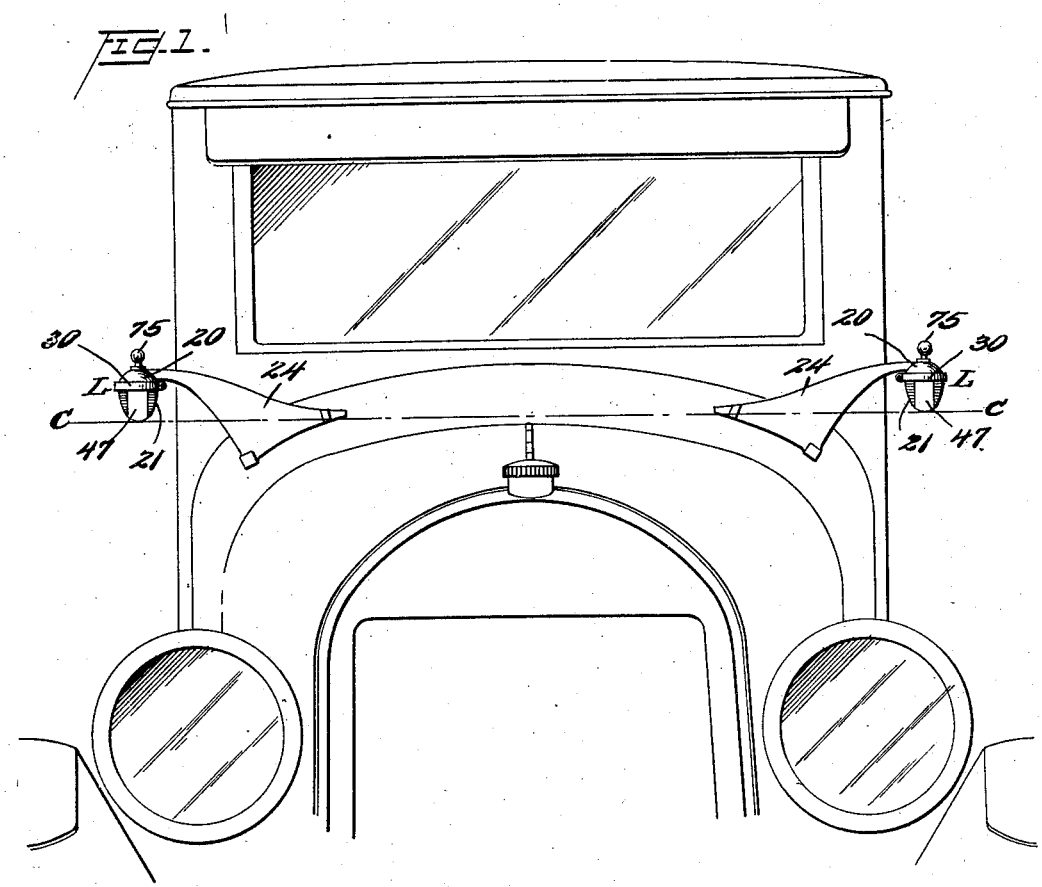
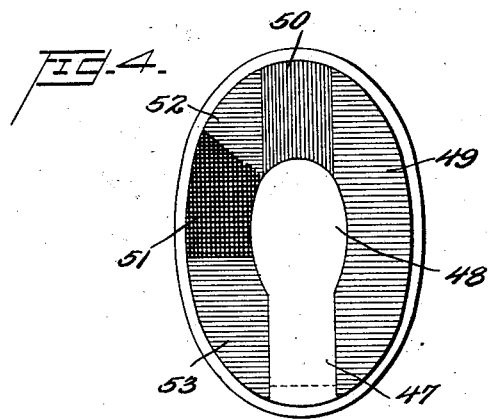
Inventor
R. G. Handy.
By Watson, Coit, Morse
 & Grindle,
Attorney July 15, 1930. R. G. HANDY 1,770,738
VEHICLE SIDE LIGHT
Filed April 25, 1927 3 Sheets-Sheet 2
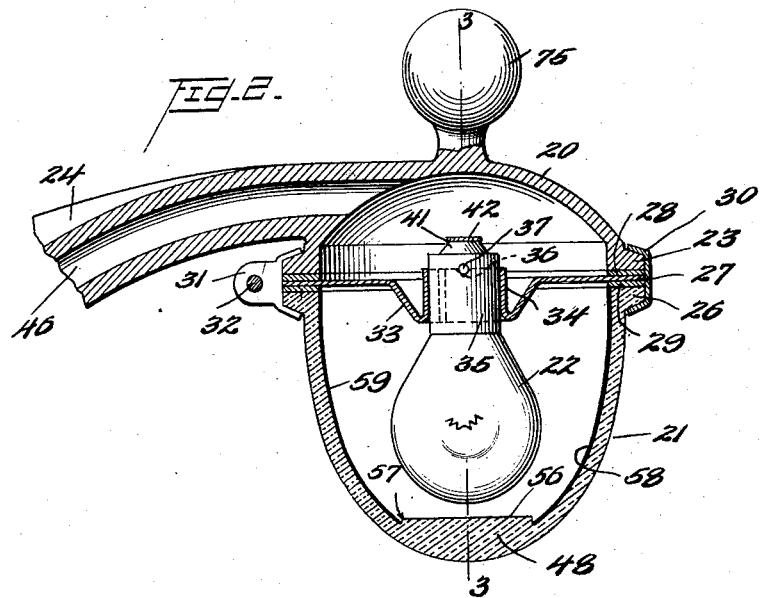
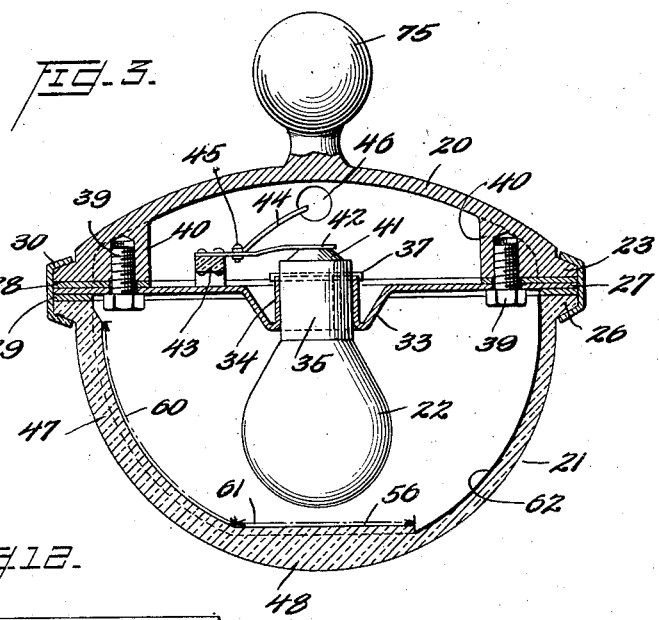
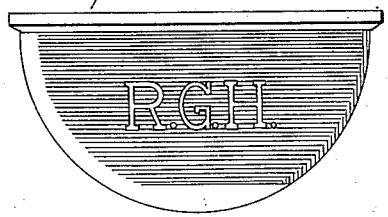
Inventor
R. G. Handy,
By Watson, Coit, Morse
& Grindle
Attorney

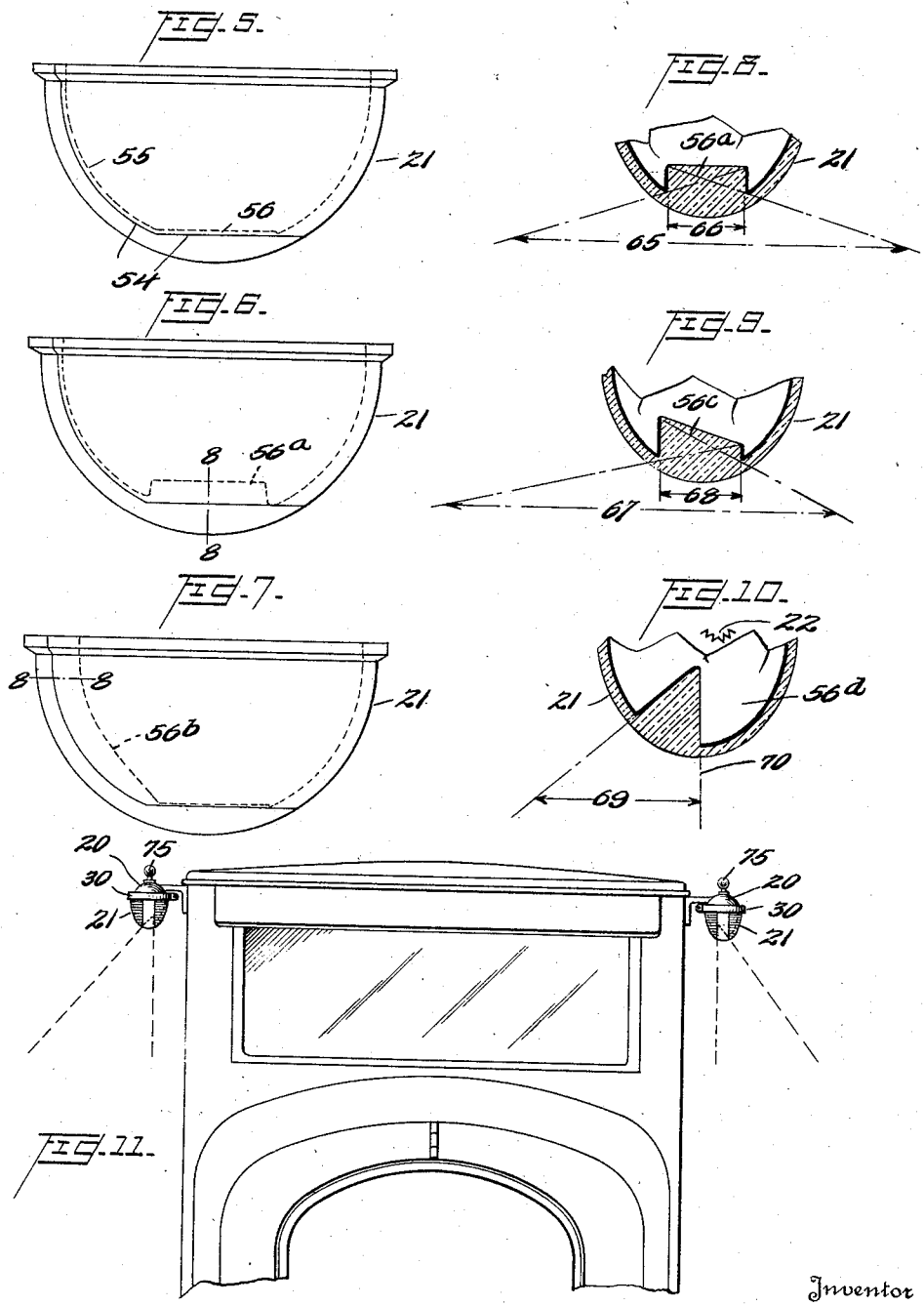

Patented July 15, 1930

1,770,738

UNITED STATES PATENT OFFICE

ROBERT G. HANDY, OF DETROIT, MICHIGAN

VEHICLE SIDE LIGHT

Application filed April 25, 1927. Serial No. 186,469.

The present invention relates to a vehicle light as an article of manufacture and in combination with the vehicle.

The problem of properly illuminating motor vehicles and the roadway therefrom, is being given intensive study but has not been satisfactorily solved. Night driving, particularly on congested highways and streets, and even in garages, is a worrisome task requiring constant vigilance. With the systems of illumination employed at present, it is anything but a pleasure. Most cities forbid the use of brilliant lights on motor vehicles and the usual dimmed lights do not give sufficient illumination so that the car itself is visible to those approaching from the side. The present-day side or cowl lights project a light of small intensity only forwardly, and are mostly a matter of ornament, although they are moderately distinguishable when viewed directly from the front. One of their great disadvantages is that they do not illuminate the car so that it is visible to those approaching from the side thereof. Some attention has been given to the improvement of the illumination secured from side lights, as indicated by the patent to Hobbs, 1,416,467; but the utilization of nearly all of the rays from these lights has not heretofore been realized.

It is the principal aim of the present invention to secure a greater illumination and utility from the side lights than with the ones previously proposed or used. The side light of the present invention is so designed and located that the following results are secured:

1. A good illumination of the road directly in front of the vehicle.

2. A good illumination of the running board and adjacent ground at the sides of the vehicle.

3. A good illumination of adjacent objects, more particularly adjacent or passing vehicles, the walls of the garage, etc.

4. The sides of the vehicle are illuminated.

5. The lamps are so disposed that they indicate the position of the vehicle. Thus both side lights are distinctly visible from almost any position in front of the windshield of the car. In other words, both lamps are visible in front of the vehicle throughout an angle of nearly 180°. Moreover a distinctively colored light is visible from all points except from directly in front of the vehicle.

6. The lights are positioned so that the motor is illuminated when the hood is raised.

7. The source of light is not directly visible to the driver.

As for the side light itself, it is an aim of the invention to provide an improved structure that at the same time is exceedingly simple and can be manufactured at a minimum cost.

Further objects are to provide a side light that is of an original, distinctive and pleasing appearance; is easy to apply to the vehicle; and is of a relatively smooth contour so that there are practically no ridges or depressions for the accumulation of dirt and so that the lights may be easily cleaned.

Other objects and features of novelty will be apparent from the description taken in connection with the drawings, in which:

Figure 1 is a partial front elevation of a motor vehicle equipped with side lights constructed in accordance with the present invention;

Figure 2 is a transverse sectional elevation through the light;

Figure 3 is a longitudinal sectional elevation through the light, taken substantially on the line 3—3 of Fig. 2;

Figure 4 is a bottom plan view of the bowl of the light;

Figure 5 is a side elevation of the bowl;

Figures 6 and 7 are side elevations of modified forms of the bowl;

Figure 8 is a partial sectional view taken substantially on the line 8—8 of Figs. 6 or 7;

Figures 9 and 10 are sectional views similar to Fig. 8, illustrating modifications;

Figure 11 is a partial front view of a motor vehicle with a form of the light shown in Fig. 10 associated therewith; and Figure 12 is a side elevation of a bowl similar to Fig. 5, showing a modification.

As shown in Fig. 1, the side lights L are designed and positioned so that they will accomplish the seven results listed above.

For this purpose, the lights are located in front of the windshield and at an elevation that is below the eyes of the driver and preferably not lower than a plane tangent to the top of the cowl illustrated by the dot and dash line C—C. They are also positioned so that roughly speaking it may be said that they are outside the outer side surfaces of the body of the vehicle.

As shown in Figs. 2 and 3, the side light in one of its preferred forms comprises the top member 20, the depending bowl 21 and the source of light 22 enclosed by the top member and bowl. This top member is concave on its under side and provided with the marginal flange 23 that is elliptical in outline, the long axis of the ellipse being disposed longitudinally of the vehicle. Preferably this top member 20 is integral with a bracket 24 secured in a suitable manner to the cowl of the vehicle. This bracket may be of various forms, but preferably should be of an original, artistic and pleasing design, so that, in combination with the lamp, the whole assembly will constitute an ornament for the vehicle.

The bowl 21 is preferably a hollow hemispheroid and is made of a light-permeable material such as glass. Its upper edge is formed with a marginal flange 26 similar to the flange 23 and clamped between these flanges is a plate 27 which supports the source of light 22. In order to prevent as far as possible the ingress of dust and moisture, gaskets 28 and 29 are interposed between the plate and the top member on the one hand and the plate and the bowl on the other hand. These parts are held or clamped together by hoop 30, the ends of which are formed with ears 31 through which passes a clamping bolt 32. By screwing up the bolt 32, the hoop 30 is contracted and the parts securely fastened together.

The center of the plate 27 is drawn downwardly as at 33 and then provided with a reentrant portion 34 forming a tube or socket to receive and engage the base 35 of the incandescent lamp 32. The upper edge of this socket is notched as at 36 to receive the pins 37 on the lamp and to prevent rotation of the lamp after it has been positioned in the socket. In order to permit the pins 37 to pass longitudinally through the socket portion, when the lamp is being inserted or removed, suitable slots are provided. The design illustrated is for the single wire method of distribution, and the socket 34 is electrically connected to one side of the battery through the plate 27 and the bracket 24. In case the gasket 28 is an insulator, cap screws 39 extend through the plate 27 and are screwed into bosses 40 on the under side of the top member 20. These screws serve the further function of supporting the plate 27 when the bowl is removed.

The center contact 41 of the incandescent bulb is engaged by a spring 42 suitably mounted on a block of insulating material 43 secured in any suitable manner to the plate 27. A conductor 44 is connected to this spring by means of a binding screw 45. Preferably the support 24 is formed with an interior conduit 46 for this conductor 44 so that the wires leading to the side lights are hidden. It will be seen that light emitted upwardly from the source of light is obstructed by the opaque top member 20. Light emitted downwardly and forwardly is uncolored, and for this purpose the forward and bottom portions 47 and 48 respectively of the bowl are uncolored. Light emitted in the remaining directions is colored or obstructed, for example blue to the outside as indicated at 49 and red to the rear as indicated at 50. Any direct view of the source of light by the driver is prevented by coloring a portion of the inner side of the light as indicated at 51. This portion may be colored black, entirely obstructing the rays, or blue to thus prevent any glare in the eyes of the driver. The remaining side portions 52 and 53 may be colored the same as the opposite side, that is, blue. Preferably the colored effect is secured by applying the proper material to the desired portions of the interior surface of the bowl and then heating so that the color is incorporated in the interior surface of the bowl. These colored areas thus in effect act like color screens.

If a low candle power bulb is used, the uncolored portions 47 and 48 may be of clear glass. Usually, however, a bulb of a higher candle power will be employed, and to comply with the laws in these cases, it is necessary to diffuse the light emitted through the uncolored portions 47 and 48. This may be accomplished by frosting the interior surfaces of the portions 47 and 48.

If the exterior front and bottom surfaces of the bowl were frosted, then when viewing the lamp from the side, the uncolored light would be visible at the front and bottom edges of the blue area. This dilutes the effect of the blue and is undesirable. To avoid this, the interior frosted or diffusion surfaces are positioned so that they do not project outside of the marginal front and bottom edges of the blue areas. Thus, as shown in Fig. 5, the marginal front and bottom edges of the blue area are indicated at 54, the interior front frosted surface at 55, and the interior bottom frosted surface at 56. It will be noted that the surfaces 55 and 56 intersect the colored side areas within the margins of said colored areas. As shown in Figs. 2 and 3, preferably the bottom interior surface 56 is flat and slightly raised at its margins from the adjacent interior surfaces. The marginal shoulder 57 thus provided incidently serves to definitely indicate to the workman the portion of the marginal edge of the areas to be colored, because with this shoulder the workman can apply the color right up to the shoulder and needs no other indicating means. In Fig. 2 the outside colored area is indicated by the heavy line 58 and the inside colored area by the heavy line 59. In Fig. 3 the uncolored front portion of the bowl is indicated by the dimension line 60, the bottom uncolored portion by the dimension line 61 and the rear colored portion by the heavy line 62.

With the lamps constructed and located as described, it will be seen that the colored areas 51 prevent the driver from having a direct view of the source of light so that he is not bothered by any glare from the same. The front and bottom uncolored areas of the bowl permit the illumination of the sides of the vehicle, the running boards, and the adjacent ground. Furthermore, the lamps are located high enough so that there is some illumination of the ground in front of the vehicle. When the hood is raised, the lights will illuminate the engine because they are located high enough and laterally out far enough to do this. The light emitted outwardly is distinctively colored so that any one approaching the vehicle from any direction is immediately informed as to the position of the same. Thus when one is directly in front of the vehicle he sees the uncolored light bordered at the vertical edges by blue areas. This is apparent from an examination of Fig. 1. When viewing the vehicle from a position in front of the same but at one side, the side blue areas are seen. Because the lights are preferably located at an elevation at least as high as the top of the cowl, both lights are visible from all positions in front of the windshield of a machine. Thus a person located at any one of these points, seeing the two lights, can immediately determine which way the machine is headed. The blue screens also permit the passage of sufficient light so that the adjacent vehicles or walls of garages are illuminated. The lights also give sufficient illumination rearwardly so that the vehicle can be backed with safety. Of course if the rear portions 50 of the bowls are uncolored, this illumination is somewhat greater than in the case where these rear portions are colored red.

It will be seen from the foregoing description that the design of the lamp in combination with its location is such that the greatest possible illumination and utility are secured from the side lamps. If the ordinary cowl lamp were located as described herein, the desired results would not be secured. On the other hand, if a lamp of the construction described herein were located as the cowl lamps usually are positioned, the features described herein would not be secured.

For some installations and locations, it will be desired to change the illuminating effects from those described above. Thus, if it is sought to vary the area, or location, of the field illuminated either to the front of the lamp or below the same, this result can be accomplished by changing the position of the frosted front or bottom surfaces. Thus, as shown in Fig. 6, if the bottom diffusion surface 56$^a$ is raised inwardly, the field of illumination will be that indicated by the dimension line 65 in Fig. 8. The maximum brilliance of the lamp will be visible in the area indicated by the dimension line 66. Of course the area indicated by the dimension line 65 is smaller than if the surface 56$^a$ were nearer the outside surface of the bowl. Likewise the area indicated by the line 65 will be smaller the more the surface 56$^a$ is moved inwardly. A like result is secured by locating the front surface 56$^b$ further inwardly, as shown in Fig. 7. In Figs. 8, 9 and 10 the heavy lines indicate colored surfaces.

If it is desired to widen the field of illumination more at one side than at the other, then the diffusion surface may be tilted as indicated at 56$^c$ in Fig. 9. Here the field of illumination is indicated by the dimension line 67, the maximum brilliance being secured over the area indicated by the dimension line 68.

Another modification is shown in Fig. 10, where the diffusion surface is indicated at 56$^d$. Here the area of illumination is indicated by the dimension line 69. It will be noted that the right hand end 70 of this line is vertically directly under the light, and the source of light 22$^a$ and surface 56$^d$ may be so positioned that direct rays from the source will strike the surface 56$^d$, although this modification is not limited to this arrangement. A light of this type would be suitable for location at elevations higher than the eyes of the driver. For example, the light could be located at the upper forward corners of the top of the vehicle as indicated in Fig. 11. Because of the particular arrangement of the diffusion surface 56$^d$, none of the rays of the light are visible from the interior of the vehicle.

If desired, an ornament 75 may be mounted on the light, as on top of the top member 20, being integral therewith or secured thereto in any suitable manner.

As shown in Fig. 12, if desired, the insignia of the particular car on which the lamps are mounted, the monogram or initials of the owner of the car, or other suitable design may be displayed on one side of the bowl. For example, the initials of the owner may be presented as shown at 76 (Fig. 12). Preferably the design 76 appears in contrasting color with respect to the adjacent area or surface. One manner of accomplishing this result is as follows: A sheet of material resembling heavy paper about one-thirty-secondth of an inch in thickness and in texture quite soft, as for instance, rubber, is cut to form a stencil of the desired monogram or design. This stencil is laid against the inner colored surface of the globe, and a sand blast directed at the openings of the stencil. The soft material of the stencil will not be cut by the sand blast, but the hard glass will be cut away, leaving the design in frosted glass surrounded by the colored field. This particular manner of producing the design on the globe is not part of my invention and is not claimed herein. The globe with the design thereon, however, is part of my invention.

Having thus described the invention, what is claimed as new and desired to be secured by Letters Patent is:

1. A vehicle light comprising, in combination, a top member, a source of light depending therefrom, a bowl depending therefrom and together with said member entirely enclosing said source of light, the front and bottom surfaces of said bowl being frosted and the remainder colored, said frosted surfaces not projecting outside of the imaginary surface determined by the marginal edges of the colored portion.

2. The combination with a vehicle of a side light comprising, in combination, a top member, a source of light depending therefrom, a bowl depending from said member and together therewith entirely enclosing said source of light, said bowl being a hollow semi-spheroid, and means supporting said light with its major axis extending longitudinally of the vehicle, the lateral sides and back of said bowl being colored and the front and bottom uncolored.

3. A vehicle side light comprising, in combination, a top member, a source of light depending therefrom, a bowl depending therefrom and together with said member entirely enclosing said source of light, means to color rays emitted to one side, the rays to the front being uncolored, and the interior bottom surface of said bowl being flat and intersecting said side within the area of the colored rays.

4. The combination with a motor vehicle, of a side light comprising a source of light, means to support said light outside the outer side of the surface of the body of the vehicle, and in front of windshield, means to prevent rays thereof passing directly to the eyes of the driver, means to color rays emitted to the outer side and there being no substantial obstruction of rays emitted downwardly and forwardly.

5. The combination with a vehicle of a side light secured thereto comprising a bowl of light-permeable material, a source of light therein, means within said bowl cooperating with said source to prevent a direct view thereof by the driver, said light being constructed to direct rays to illuminate the side of the vehicle and the road surface adjacent said vehicle and forwardly, and means within said bowl to color light rays emitted to the outside and rearwardly of said light for indicating the position of said vehicle.

6. The combination with a vehicle of a side light comprising an opaque top member, a bowl of light-permeable material depending therefrom, a source of light within said bowl, a colored screen positioned to intercept the rays from said source throughout a horizontal arc of more than 90°, and means to prevent a direct view of said source throughout another horizontal arc of approximately 45°, rays emitted forwardly and downwardly from said source passing through said bowl uncolored.

7. A vehicle light comprising, in combination, a top member, a plate disposed against the lower marginal edge of said member, a source of light depending from said plate, a bowl of light permeable material having its upper edge disposed against said plate, and means securing said parts together.

8. As an article of manufacture, a bowl of light-permeable material for a vehicle light having a portion of its interior surface raised inwardly with respect to the surrounding surface, said raised surface being smooth and uncolored and acting to limit the field illuminated therefrom to a predetermined area, a portion of the remainder of the bowl's surface including the marginal walls of the raised portion being colored.

9. As an article of manufacture, a bowl of light-permeable material for a vehicle light having a portion of its wall thickened and the interior thereof treated to provide a light diffusing surface, and a portion of the remainder of the bowl's surface including the marginal walls of the raised portion being colored.

10. As an article of manufacture, a bowl of light-permeable material for a vehicle light having a portion of its wall thickened, the position of the interior surface of said thickened portion determining the field illuminated thereby, and at least a portion of the remainder of the bowl's surface being colored.

In testimony whereof I hereunto affix my signature.

ROBERT G. HANDY.